United States Patent
Robson et al.

(10) Patent No.: US 11,442,731 B2
(45) Date of Patent: Sep. 13, 2022

(54) DATA PROCESSING SYSTEMS INCLUDING AN INTERMEDIATE BUFFER WITH CONTROLLED DATA VALUE EVICTION

(71) Applicant: Arm Limited, Cambridge (GB)

(72) Inventors: John David Robson, Cambridge (GB); Sean Tristram LeGuay Ellis, Farnham (GB); William Robert Stoye, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/656,385

(22) Filed: Oct. 17, 2019

(65) Prior Publication Data
US 2021/0117192 A1    Apr. 22, 2021

(51) Int. Cl.
*G06F 9/30* (2018.01)

(52) U.S. Cl.
CPC .................... *G06F 9/3012* (2013.01)

(58) Field of Classification Search
CPC .. G06F 9/3012; G06F 9/3004; G06F 9/30043; G06F 9/30047; G06F 9/30072
USPC ........................................................ 712/220
See application file for complete search history.

(56) References Cited

U.S. PATENT DOCUMENTS

| | | | |
|---|---|---|---|
| 9,600,288 B1* | 3/2017 | Potter .................. | G06F 9/3887 |
| 2013/0103930 A1* | 4/2013 | Horikawa ............. | G06F 9/3834 |
| | | | 712/216 |
| 2014/0181402 A1* | 6/2014 | White ................ | G06F 12/0897 |
| | | | 711/122 |
| 2015/0212851 A1* | 7/2015 | Busaba ................ | G06F 9/3859 |
| | | | 711/151 |
| 2017/0024323 A1* | 1/2017 | Havlir .................. | G06F 9/3802 |
| 2017/0060762 A1* | 3/2017 | Guthrie ............... | G06F 12/0875 |
| 2017/0075810 A1* | 3/2017 | Havlir ................. | G06F 12/0848 |
| 2018/0267809 A1* | 9/2018 | Li ........................ | G06F 9/30098 |
| 2020/0065104 A1* | 2/2020 | Kenney ................ | G06F 9/3851 |

* cited by examiner

*Primary Examiner* — Shawn Doman
(74) *Attorney, Agent, or Firm* — Vierra Magen Marcus LLP

(57) ABSTRACT

A data processor includes an execution unit that executes instructions to perform data processing operations, a register file operable to store data values for use by and produced by the execution unit, and a buffer intermediate between the register file for providing data values from the register file to the execution unit for use when executing an instruction, and to receive output data values from the execution unit for writing to the register file.
Instructions to be executed by the execution unit of the data processor have associated buffer eviction priority indications representative of a priority for eviction from the buffer of an output data value that will be generated when executing the instruction. The buffer eviction priority indications are then used when selecting data values to evict from the buffer.

20 Claims, 8 Drawing Sheets

DATA PROCESSING SYSTEMS INCLUDING AN INTERMEDIATE BUFFER WITH CONTROLLED DATA VALUE EVICTION

BACKGROUND

The technology described herein relates generally to the operation of data processors that execute program instructions to perform processing operations, such as in a graphics processor that executes a graphics processing pipeline that includes one or more programmable processing stages ("shaders").

Graphics processing is typically carried out in a pipelined fashion, with one or more pipelined stages operating on the data to generate the final render output, e.g. frame that is displayed. Many graphics processing pipelines now include one or more programmable processing stages, commonly referred to as "shaders". For example, a graphics processing pipeline may include one or more of, and typically all of: a geometry shader, a vertex shader and a fragment (pixel) shader. These shaders are programmable processing stages that execute shader programs on input data values to generate a desired set of output data, such as appropriately shaded and rendered fragment data in the case of a fragment shader, for processing by the rest of the graphics processing pipeline and/or for output.

In graphics shader operation, each graphics work "item" in a graphics output, such as a render target, e.g. frame, to be generated (an "item" in this regard is usually a vertex or a sampling position (e.g. in the case of a fragment shader)) will be processed by means of an execution thread which will execute the instructions in the shader program in question for the graphics work "item" in question.

In order to execute shader programs, a graphics processor (graphics processing unit (GPU)) will include an appropriate execution unit or units (circuit or circuits) for that purpose. The execution unit(s) will include programmable processing circuit(s) for executing shader programs (the "shaders" of graphics processing pipeline).

The actual data processing operations that are performed by the shader execution unit when executing that shader program are usually performed by respective functional units (circuits), such as arithmetic units (circuits), of the execution unit, in response to, and under the control of, the instructions in the (shader) program being executed. Thus, for example, appropriate functional units, such as arithmetic units, will perform data processing operations in response to and as required by instructions in a (shader) program being executed.

When executing an instruction in a program, the execution unit (e.g. the appropriate functional unit, such as an arithmetic unit, of the execution unit) will typically read one or more input data values (operands), perform a processing operation using those input data values to generate an output data value, and then return the output data value, e.g. for further processing by subsequent instructions in the program being executed and/or for output (for use otherwise than during execution of the program being executed).

The input data values to be used when executing the instruction will typically be stored in appropriate storage accessible to the execution (functional) unit, such as a register file (a set of registers) of and/or accessible to the execution unit, and the output data value(s) generated by the execution (functional) unit when executing the instruction will correspondingly be written back to that storage, e.g. register file, for future use. Thus when executing an instruction, an execution unit will read input data values (operands) from appropriate storage, such as a register file, and write its output value(s) back to that storage (e.g. register file).

In order to facilitate this operation, the instructions to be executed will typically indicate the location of the input data value(s) (operand(s)) for the instruction, e.g. in terms of the registers where those value(s) are stored, and, correspondingly, the location where the output data value(s) is to be written to, again, e.g., and typically, in terms of the identity of the register where the output data value(s) is to be written. The execution unit will then, when executing the instruction, read the input value(s) from the indicated location(s) (e.g. register(s)), and write its output value(s) back to the indicated destination location(s) (e.g. register(s)).

The Applicants believe that there remains scope for improvements to the operation when executing sequence of instructions in an execution unit of a data processor, such as a graphics processor.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figures 1, 2:
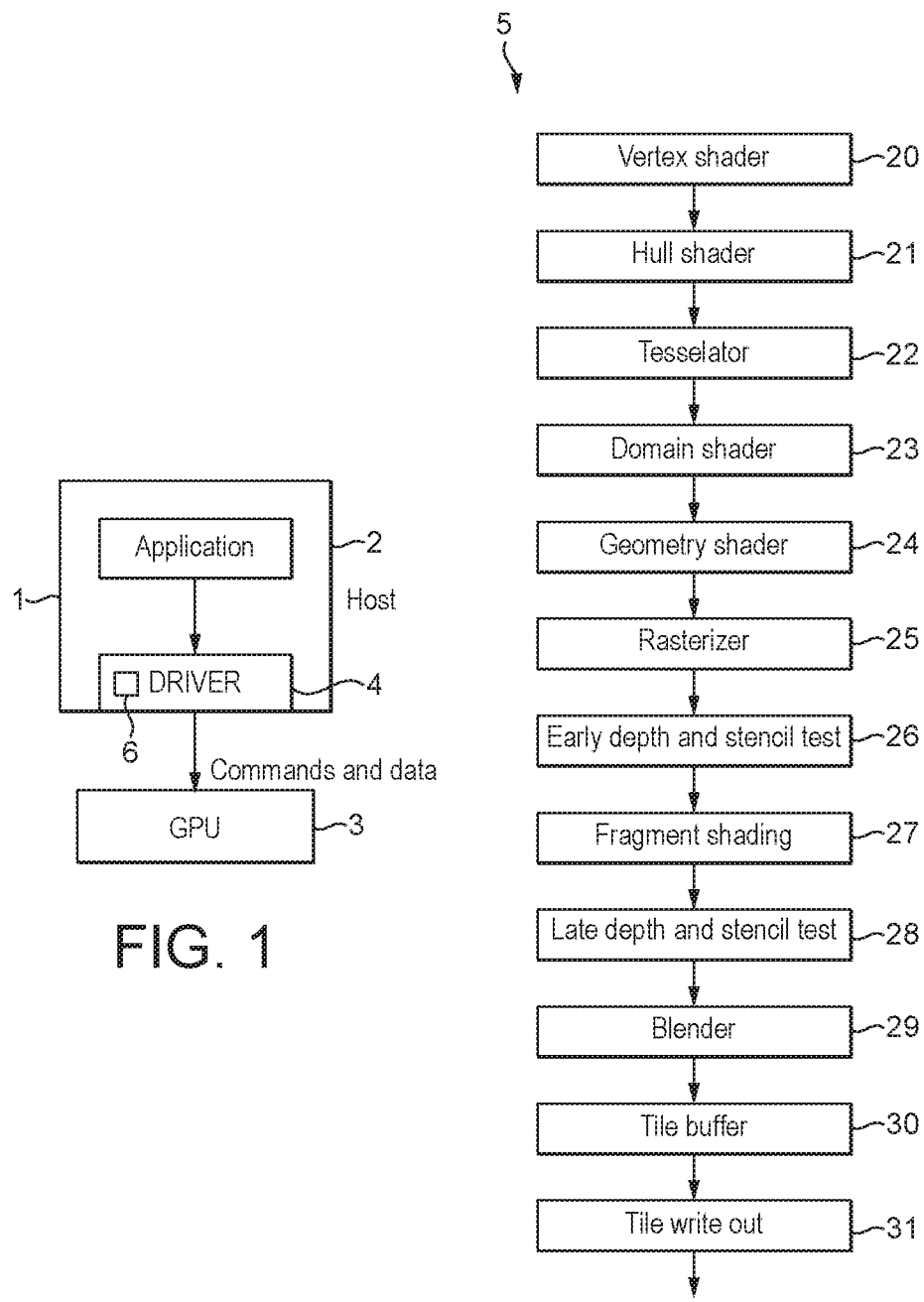
FIG. 1 shows an exemplary computer graphics processing system.
FIG. 2 shows schematically a graphics processing pipeline that can be operated in the manner of the technology described herein.

A first embodiment of the technology described herein comprises a method of operating a data processing system, the data processing system comprising:

a data processor in which execution threads may execute program instructions to perform data processing operations, the data processor comprising:
  an execution unit operable to execute instructions in a program to be executed to perform data processing operations for execution threads executing the program; and
  storage operable to store data values for use by the execution unit when executing an instruction to perform a data processing operation for an execution thread and to store output data values generated by the execution unit when performing a data processing operation for an instruction being executed by an execution thread;
the data processor further comprising:
  a buffer intermediate between the storage and the execution unit, the buffer being operable to receive data values from the storage and to provide data values to the execution unit for use when executing an instruction, and to receive output data values from the execution unit for writing to the storage; and a buffer controller configured to select data values in the buffer for writing to the storage and to trigger the writing of selected data values from the buffer to the storage;

the method comprising:

for a program comprising a set of instructions to be executed by the execution unit of the data processor:

associating with at least one instruction in the program to be executed by the execution unit of the data processor an indication representative of a priority for eviction from the buffer of an output data value that will be generated when executing the instruction;

the execution unit, when executing an instruction in the program that has an associated indication representative of a priority for eviction from the buffer of an output data value that will be generated when executing the instruction:

writing into the buffer:

an output data value generated when executing the instruction and an indication representative of the priority for eviction from the buffer for the output data value associated with the instruction; and the buffer controller, when a data value is to be evicted from the buffer:

selecting a data value to evict from the buffer using, at least in part, any indications representative of a priority for eviction from the buffer stored with data values in the buffer; and evicting the selected data value from the buffer.

A second embodiment of the technology described herein comprises a data processing system, the data processing system comprising:

a data processor in which execution threads may execute program instructions to perform data processing operations, the data processor comprising:

an execution unit operable to execute instructions in a program to be executed to perform data processing operations for execution threads executing the program; and storage operable to store data values for use by the execution unit when executing an instruction to perform a data processing operation for an execution thread and to store output data values generated by the execution unit when performing a data processing operation for an instruction being executed by an execution thread;

the data processor further comprising:

a buffer intermediate between the storage and the execution unit, the buffer being operable to receive data values from the storage and to provide data values to the execution unit for use when executing an instruction, and to receive output data values from the execution unit for writing to the storage; and a buffer controller configured to select data values in the buffer for writing to the storage and to trigger the writing of selected data values from the buffer to the storage;

the data processing system further comprising:

a processing circuit operable to, for a program comprising a set of instructions to be executed by the execution unit of the data processor:

associate with at least one instruction in the program to be executed by the execution unit of the data processor an indication representative of a priority for eviction from the buffer of an output data value that will be generated when executing the instruction;

wherein:

the execution unit of the data processor is further configured to, when executing an instruction in a program that has an associated indication representative of a priority for eviction from the buffer of an output data value that will be generated when executing the instruction:

write into the buffer:

an output data value generated when executing the instruction and an indication representative of the priority for eviction from the buffer for the output data value associated with the instruction; and the buffer controller is further configured to, when a data value is to be evicted from the buffer:

select a data value to evict from the buffer using, at least in part, any indications representative of a priority for eviction from the buffer stored with data values in the buffer;

and evict the selected data value from the buffer.

The technology described herein relates to a data processor that executes instructions to perform data processing operations. The data processor includes suitable storage, such as a register file, where the input and output data values for data processing operations being performed by executing instructions are stored.

However, in the technology described herein, in addition to the "primary" storage, such as the register file, where the input and output values for the instructions are stored, the data processor further comprises a buffer intermediate between the "primary" storage, e.g. register file, and the execution unit that processes the data values, which is operable to store data values from the "primary" storage for use by the execution unit, and data values output by the execution unit for storage in the "primary" storage.

As will be discussed in more detail below, this buffer can act as a more local, temporary storage for data values being used and/or produced by the execution unit when executing instructions, so as to, for example, reduce the need to fetch data values from and write data values to the "primary" storage, such as the register file, when executing a sequence of instructions. This may then reduce "primary" storage, register file, bandwidth and so accordingly reduce energy consumption, and make "primary" storage, e.g. register file, bandwidth available for other uses.

For example, an output value written by one instruction and that is to be read by a subsequent instruction may be able to be retained in the buffer between the execution of the two instructions, thereby avoiding the need to write that value out to the "primary" storage, e.g. register file, and then read it back in from the "primary" storage for the subsequent instruction. This can then reduce the latency between the execution of the instructions and avoid the need to read the data value from the "primary" storage, e.g. register file, and, potentially, also avoid the need to write the data value to the primary storage, e.g. register file, thereby reducing primary storage bandwidth and reducing energy consumption.

As will be discussed further below, the Applicants have further recognised that while, as discussed above, the use of such a buffer intermediate between an execution unit and the, e.g. the register file, is beneficial, it may not be practical, nor desirable, for that buffer to have a capacity to store as many data values (entries) as the primary storage, e.g. register file. As such, the intermediate buffer should, and in an embodiment does, only have capacity for a limited number of data values (entries). The effect of this then is that it may be desirable in use to be able to replace entries in the buffer with new input data values for, and/or output data values generated by, an instruction. As such, there will need to be some mechanism for controlling the replacement of data values in the buffer. This is facilitated in the technology described herein by having a buffer controller that is operable to select data values for eviction from the buffer (e.g. when space in the buffer is required for a new data value).

Furthermore, in the technology described herein, instructions that generate output data values for writing to the buffer may include indications representative of the priority of the output data value for the instruction for eviction from the buffer. As will be discussed further below, the Applicants have recognised that by providing such indications ("hints") indicative of a priority for eviction for data values in the buffer, that can allow more efficient and effective data value eviction from the buffer to be performed, thereby, for example, reducing stall cycles and improving average utilisation of the buffer resource, which in turn may further reduce primary storage, e.g. register file, bandwidth (and so reduce energy consumption and make primary storage (register file) bandwidth available for other uses).

In particular, the Applicants have recognised that while it would be possible to select data values for eviction from the buffer based on relatively simple eviction schemes, such as "first in, first out", or "least recently used", type schemes, that may not be the most optimal eviction scheme to use for the buffer. In particular, the Applicants have recognised that when generating a sequence of instructions for a program for execution by an execution unit of a data processor, it may be possible to determine those output data values for instructions that are more likely to be used by subsequent instructions (and, e.g., only by subsequent instructions in the sequence of instructions in question) (such that it may then be beneficial to try to retain those data values in the buffer), and vice-versa. Thus a measure of the desirability of retaining output data values from the instructions in the buffer (and vice-versa) can be determined when generating the sequence of instructions for a program to be executed by an execution unit.

The Applicants have further recognised that this "eviction priority" measure can be indicated to the eviction process for the buffer by including an indication of this measure in the instructions themselves. This then facilitates more straightforwardly conveying the "eviction priority" information to the execution unit (and in particular to the buffer controller of the execution unit), with the execution unit (and in particular the buffer controller of the execution unit) then using the "eviction priority" indications included in the instructions when selecting data values to evict from the buffer.

Furthermore, because the "eviction priority" indications are included in the instructions themselves, the indication can be ignored or disabled, as desired, if the operation in the manner of the technology described herein is inappropriate or not supported for any reason.

This all then straightforwardly provides a more optimised data value eviction operation for the buffer, without the need for significant modification to other aspects of the data processor and its operation, and that can still provide improved average utilisation of the buffer and reduced primary storage (register file) bandwidth, etc.

The data processor can be any desired and suitable data processor that can execute program instructions. In general the data processor is in an embodiment a data processor that can perform vector (SIMD (single instruction multiple data)) processing, such as a graphics processor, a vector processor, a DSP or a CPU (when performing SIMD processing). In an embodiment, the data processor is a graphics processor (graphics processing unit (GPU)).

The operation in the manner of the technology described herein may be performed for any suitable and desired program that is to be executed by the data processor. In the case of a graphics processor, the program may be, and is in an embodiment, a (graphics) shader program. The program may be, for example, a geometry shader program (a program for executing geometry shading operations), a vertex shader program (a program for executing vertex shading operations), or a fragment shader program (a program for executing fragment shading operations).

The program will comprise a sequence of instructions to be executed. The set (sequence) of instructions being executed for the program can be any desired and suitable instructions. The program instructions may comprise, for example, one or more or all of: arithmetic (mathematical) operations (add, subtract, multiply, divide, etc.), bit manipulations (invert, swap, shift, etc.); logic operations (AND, OR, NAND, NOR, NOT, XOR, etc.); load-type instructions (such as varying, texturing or load instructions in the case of graphics processing); and store type instructions (such as blend or store instructions).

In an embodiment, the technology described herein is used for and when the data processor (the execution unit of the data processor) is executing a (programmable) processing stage of a data processing pipeline. In this case therefore, the execution unit will be executing a program (a set of instructions) to perform processing operations of a (programmable) processing stage of a data processing pipeline.

In the case of a graphics processor executing a graphics processing pipeline, the programmable processing stage in an embodiment comprises a programmable shading stage (shader). The programmable processing stage that the program is executing may, for example, be a geometry shading stage (geometry shader), a vertex shading stage (vertex shader), or a fragment shading stage (fragment shader).

The operation in the manner of the technology described herein can be, and is in an embodiment, used for plural processing stages of a data processing pipeline (where the pipeline comprises plural programmable processing stages). In an embodiment the operation in the manner of the technology described herein is used for all (programmable) processing stages that the data processor, e.g. graphics processor, may be required to execute.

The operation in the manner of the technology described herein may be performed by and for each and every program and/or (programmable) processing stage that the data processor executes, or only for particular categories or types of program or processing stage but not for other categories or types of program or processing stage, e.g., as desired and as appropriate. The, e.g., compiler, could, e.g., indicate whether the technology described herein is being used for a program to be executed or not.

The data processor may comprise a single execution unit, or may have plural execution units. Where there are a plural execution units, each execution unit can in an embodiment operate in the manner of the technology described herein.

Where there are plural execution units, each execution unit may have its own storage and buffer intermediate to that storage, or there may be a single storage and/or a single buffer, shared between plural (e.g. some or all) of the separate execution units.

Where there are plural execution units, each execution unit may be provided as a separate circuit to other execution units of the data processor, or the execution units may share some or all of their circuits (circuit elements).

The or each execution unit may, and in an embodiment does, comprise appropriate circuits (processing circuits/logic) for performing the operations required of the execution unit.

Thus, the (and each) execution unit will, for example, and in an embodiment does, comprise a set of at least one functional unit (circuit) operable to perform data processing operations for an instruction being executed by an execution thread. An execution unit may comprise only a single functional unit, or could comprise plural functional units, depending on the operations the execution unit is to perform.

The functional unit or units can comprise any desired and suitable functional unit or units operable to perform data processing operations in response to and in accordance with program instructions. Thus the functional unit or units in an embodiment comprise one or more or all of: arithmetic units (arithmetic logic units) (add, subtract, multiply, divide, etc.), bit manipulation units (invert, swap, shift, etc.), logic operation units (AND, OR, NAND, NOR, NOT, XOR, etc.), load-type units (such as varying, texturing or load units in the case of a graphics processor), store type units (such as blend or store units), etc.

The functional units can be implemented as desired and in any suitable manner. They will comprise (be implemented as) suitable hardware elements such as processing circuits (logic).

An (the) execution unit may, for example, comprise plural sets of functional units, with each set of functional units performing a particular, and, e.g., different, form of operation. For example, there may be a set of functional units (pipeline) for performing arithmetic operations (an arithmetic pipe) (and comprising, inter alia, arithmetic units), another set of functional units that performs loads/store operations (a load/store pipe) (and comprising, inter alia, load and/or store type functional units), and so on.

Where an execution unit has plural sets of functional units (pipelines), then each set of functional units may have its own storage and buffer intermediate to that storage, or there may be storage and/or a buffer shared between plural (e.g. some or all) of the separate sets of functional units.

In an embodiment, all the sets of functional units in an embodiment have access to the (same) (shared) storage for the execution unit, but on the other hand, in an embodiment only some but not all of the sets of functional units have a buffer for storing data values locally to the set of functional units. For example, an arithmetic pipe (set of functional units) in an embodiment has a buffer, but a load/store pipe (set of functional units) may not.

The data processor in an embodiment also comprises any other appropriate and desired units and circuits required for the operation of the execution unit(s), such as appropriate control circuits (control logic) for controlling the execution unit(s) to cause and to perform the desired and appropriate processing operations. In an embodiment, the data processor in an embodiment comprises one or more of, and in an embodiment all of: an instruction decode circuit or circuits operable to decode instructions to be executed so as to cause the execution unit(s) to execute the required instructions; an instruction fetch circuit or circuits operable to fetch instructions to be executed (prior to the decode circuit(s)); an instruction cache; and an execution thread generator and scheduler (spawner) that generates (spawns) threads for execution.

The storage operable to store data for use by the execution unit or units of the data processor can take any suitable and desired form. It is in an embodiment in the form of appropriate RAM, in an embodiment SRAM. In an embodiment, this storage is in the form of a set of registers (a register file) of or accessible to the data processor. There may be a single storage (register file) for all the execution units of the data processor, or there may be plural different sets of such storage (register files), e.g. for respective and individual ones or subsets of the execution units of the data processor. The set(s) of registers (register file(s)) can be arranged in any suitable and desired manner, e.g., as comprising single or plural banks, etc.

The data processor in an embodiment has an appropriate interface to, and communication with (such as a load/store pipe) memory of or accessible to the data processor, such as a main memory of the data processing system that the data processor is part of, for loading data values from memory into the storage and writing data values from the storage to the memory.

The buffer intermediate between the storage and the execution unit that receives data values from the storage (register file) and provides those data values to the execution unit (to a functional unit or units of the execution unit) for use when executing instructions, and that receives output data values from the execution unit (from a functional unit or units of the execution unit) for writing to the storage (register file) can take any suitable and desired form.

Again, there may be a single buffer intermediate between the storage (register file or files) and the execution unit(s), or there may be plural buffers, e.g. for respective ones or subsets of the execution units.

The buffer should be, and is in an embodiment, arranged locally to (closer to) the execution unit(s) that it serves (as compared to the storage (register file) from where data values are loaded to the buffer and sent from the buffer for more "permanent" storage). A (the) buffer is in an embodiment only accessible to the execution unit or units that it serves (in contrast to the storage (register file) that may be accessible to other execution units, components, elements, etc., of the data processor).

The buffer is in an embodiment implemented as a set of flip-flops (rather than SRAM).

The buffer that stores the data values intermediate to the main storage (register file) and the execution unit(s) can be configured in any suitable and desired manner. In an embodiment, the buffer can store a plurality of data value entries (but fewer entries (data values) than the "main" storage (register file)). In embodiments, the buffer can store of the order of 8 entries (e.g. 8 entries) (whereas the register file may, e.g., have of the order of 64 registers per thread).

Each entry in a (the) buffer can in an embodiment store a single data value for each thread executing an instruction in parallel (in lock step) (in a SIMD system). Thus each entry in the buffer may store only a single data value (for one thread), but in an embodiment stores plural data values (one data value for each of plural threads). For example, where the execution unit can execute 16 threads in parallel (in lockstep), each buffer entry can in an embodiment store 16 data values (one for each thread).

Each entry in the buffer in an embodiment stores the data value (for each of the threads in question) from (in the case of an input value) or for (in the case of an output value) a particular register.

In addition to the data value itself, each buffer entry in an embodiment stores an identifier (a tag) for the entry (for the data values in the entry). This tag is in an embodiment an index for (the register index of) the register from which the data value has been fetched (for an input data value) or an index for (the register index of) the register to which the data value should be written (for an output data value).

Each buffer entry in an embodiment also has an associated "free" flag that can be set to indicate that the entry is free and so available to store a new data value.

As well as the entries in the buffer storing the data values, in accordance with the technology described herein a, and in an embodiment plural, and in an embodiment each, data entry in the buffer can also have stored for it an indication of a priority for eviction from the buffer of a data value stored in that buffer entry. Thus, in an embodiment, each buffer entry has stored for it, and includes a field for, an eviction priority indication in the manner of the technology described herein.

For any buffer entry in which an output data value generated by an instruction which has an associated eviction priority indication is being stored, the eviction priority indication for that buffer entry will be set based on, and corresponding to, the eviction priority indication associated with the instruction in question.

On the other hand, for buffer entries that are storing data values that are not output values from instructions having associated eviction priority indications, such as in the case of buffer entries storing input data values for instructions (data values read from the storage (register file), then the priority indications for those data entries are in an embodiment set to a particular, in an embodiment selected, in an embodiment predefined, default (priority) value, when they are loaded into the buffer (the buffer entry in question). In an embodiment, the particular, default eviction priority value is indicative of a low priority for eviction, and in an embodiment the lowest indicatable priority for eviction. Thus, in an embodiment, the eviction priority indication for a buffer entry that is storing instruction input data values (values read from the storage (register file)) is set to a low priority for eviction, and in an embodiment to the lowest indicatable priority for eviction. (Once such input values have been used, such that they are no longer required, they (the entry) can be marked as "free", so it can be used for new data.)

In the technology described herein, instructions to be executed by the data processor can be associated with indications representative of a priority for eviction from the buffer of an output data value that will be generated when executing the instructions. In an embodiment only certain, particular, e.g. some (but not all), of the instructions in a program to be executed are associated with eviction priority indications, such as selected instructions, e.g. meeting particular criteria.

In an embodiment, (all) instructions that produce an output value have an associated eviction priority indication. Thus, in an embodiment, where the technology described herein is being used for a program, all the instructions in the program to be executed that write a result (an output data value) to the buffer (to the storage) have an associated eviction priority indication.

In an embodiment, instructions that do not write an output value to the buffer (to the storage) do not have an associated eviction priority indication. Thus, in an embodiment, instructions that produce no results (e.g. jump, NOP, instructions, etc.) do not have an associated eviction priority indication.

Similarly, instructions that execute in a set of functional units (pipeline) that do not have a buffer intermediate between the storage and the functional units and instead, e.g., write directly to the storage (such as load instructions), in an embodiment do not have an associated eviction priority indication.

Other arrangements would, of course, be possible.

The indication representative of a priority for eviction from the buffer of an output data value for an instruction can be provided in any suitable and desired manner. For example, particular types of instructions could be associated with particular, in an embodiment selected, in an embodiment predefined, eviction priority indications (priorities), such that the eviction priority indication for a given instruction can be (and is) implicitly derived from the type of (from a property of) the instruction in question.

However, in an embodiment, the eviction priority indications are associated with the instructions (that have eviction priority indications) by explicitly indicating eviction priority indications for the instructions. Thus, in an embodiment, an instruction is associated with an eviction priority indication by providing an explicit and specific eviction priority indication for the instruction in question. This will then allow, e.g., the eviction priority to be set based on the instructions that will consume the result produced by the instruction in question (rather than being based on the type of instruction that is producing the output data value).

In an embodiment, the indications are provided as a part of the encoding for the instructions (as part of the instruction), e.g., and in an embodiment, as a (defined) field in the encoding for the instructions, and, in an embodiment, having a particular, in an embodiment selected, in an embodiment predefined, position in the instruction encoding.

As well as the indication representative of the priority for eviction from the buffer of an output data value for the instruction, an instruction can otherwise include any suitable and desired information, e.g., fields.

In an embodiment, an (and each) instruction includes, in addition to the indication representative of the eviction priority, one or more of, and in an embodiment all of: an opcode indicating an operation to be performed in response to the instruction (the operation(s) to be performed when executing the instruction); an indication of an input data value or values (the operand(s)) for the instruction (in an embodiment in the form of an indication of the register(s) where the input data value(s) (operand(s)) should be read from; and an indication of where an output data value that will be generated when executing the instruction should be stored (again, this is in an embodiment in the form of the identity of the register where the output data value should be stored (written to)).

An instruction may also include (encode) other information to control the execution of the instruction, for example in accordance with the instruction set architecture for the data processor and data processing system in question.

Other arrangements would, of course, be possible.

The indications representative of a priority for eviction for output data values for instructions can take any suitable and desired form.

In an embodiment, the eviction priority indications indicate a relative priority for eviction from the buffer. For example, a single bit indication (flag) could be used to indicate one of two relative priority levels for eviction from the buffer (a higher priority for eviction and a lower priority for eviction), and a two-bit indication could be used to indicate any one of four priority levels for eviction (and so on). In an embodiment, the eviction priority indication can indicate either one of two levels of priority for eviction, or one of four relative levels of priority for eviction.

It would also be possible to provide eviction priority indications that do not simply indicate different relative levels of eviction priority. For example, eviction priority indications that provide other forms of information that can be used to determine a priority for eviction from the buffer of a data value could also or instead be used if desired.

For example, the eviction priority indication could be in the form of (or include) an indication of how far in the future execution of the program the output data value is (to be) used (for example in terms of the number of instructions before the data value is used) (and in one embodiment, this is what is done). The eviction priority indication could also or instead indicate whether the output data value will be needed (used) outside of the execution unit that is executing the program, such as by another part, e.g., execution unit, of the data processor. This can be instead of, or in addition to also providing as part of the eviction priority indication, an indication of a relative level of eviction priority for the instruction.

The priority for eviction that is set for (indicated for) an instruction can be selected and set based on any suitable and desired conditions and criteria.

In an embodiment, the priority for eviction for an instruction (for the output data value) is based on one or more of, in an embodiment plural of, and in an embodiment all of: whether the output data value will be used as an input data value for another instruction in the program being executed (and, in that case, in an embodiment how far in the future (in an embodiment in terms of the number of instructions) the output data value will be used as an input data value for another instruction, and/or how many other instructions in the program being executed the output data value will be used as an input data value for); whether the output data value will be used (consumed) solely by the program being executed (which the instruction is part of); whether the output data value will be required for execution of another, different program; whether the output data value for the instruction will be used (consumed) solely by the execution unit that is executing the instruction to generate the data value; whether the output data value for the instruction will be required outside the execution unit that is executing the instruction, for example for use by another execution unit or other processing unit (process) of the data processor or otherwise required to be output from the execution unit, for example to memory.

In an embodiment, an instruction is associated with an indication indicating a higher priority for eviction from the buffer for an output data value that will be generated when executing the instruction, when the output data value will not just be (will be otherwise than just) consumed locally by execution of the program in question (and/or by the execution unit in question) (as that should then have the effect that the output data value will preferentially be written back to the storage (register file), which may have to happen in any event for the output data value to be made available to the other unit(s), etc., of the data processor that will need it).

Thus, in an embodiment, an instruction is associated with an indication indicating a higher priority for eviction from the buffer for an output data value that will be generated when executing the instruction, when the output data value will be required when executing another program and/or by another execution unit, and/or for output in any event from the data processor (as in that case it is likely that the output data value will have to be written back to the storage (register file)) at some point so as to be made available to other execution units or processors of, or so as to provide an output for, the data processor).

Correspondingly, any output data values that will be required outside the execution unit that is executing the instruction, e.g. that are to be passed to other parts/units of the data processor and/or to be written out to (main) memory of or for the data processor (of the overall data processing system that the data processor is part of), are in an embodiment again indicated as being higher priority for eviction from the buffer, as those data values will have to be written back to the storage (register file) and then, e.g., to main memory, etc., at some point in any event.

Correspondingly, an output data value that will be used (consumed) only by the program being executed and/or within the execution unit that is executing the instruction (program) is in an embodiment marked as being a lower priority for eviction from the buffer (as in that case it may be that the output value can remain in the buffer and be used from the buffer, without the need to write it back to the storage (register file) at all).

Similarly, instructions whose output data values are to be used by other instructions in the program in question (and in an embodiment other instructions in the program in question that are relatively close in the execution sequence to the instruction that is generating the data value) are in an embodiment marked as a lower priority for eviction from the buffer (as in that case again the intention would be to try to retain those output data values in the buffer so that they can be used from the buffer by the later instructions in the program without ever being written back to the storage).

This will then help to reduce the potential number of storage (register file) writes and reads that may be required with executing the program in question.

In an embodiment, instructions are set as a low (a lower) priority for eviction unless they are identified as being suitable to be set for a higher priority for eviction (i.e. the "default" setting is a low priority for eviction).

Other arrangements and criteria would, of course, be possible.

The selection and setting of the indications representative of priority for eviction for instructions in a program to be executed by the data processor can be performed in any suitable and desired manner and by any suitable and desired element or component of the data processing system that the data processor is a part of.

In an embodiment, the compiler (the compilation process) for the program being executed is operable to, and is configured to, select and set for instructions in the program the eviction priority indications. The Applicants have recognised in this regard that the compiler for the programs being executed will be able to determine information about, and should have knowledge of, how the output data values generated by instructions in a program will be used, and so therefore can, for example, and in an embodiment, assess the use of the output data values for instructions in a program in accordance with one or more or all of the criteria discussed above, and then set the eviction priority indications for the instructions in the compiled program that is provided to the data processor for execution accordingly.

Thus, in an embodiment, the processing circuit operable to associate eviction priority indications with instructions in a program to be executed comprises a compiler (a compiler circuit) operable to (and configured to) compile programs for execution by the data processor (by the execution unit of the data processor).

Thus, in an embodiment, the program (source code) that is provided, e.g. by an application on a host processor that requires the data processing, is analysed, e.g., and in an embodiment by a compiler, to assess the use of output data values generated by instructions in the program, and to set eviction priority indications for the output data values for the instructions on the basis of that analysis. This analysis and setting of the eviction priority indications is in an embodiment based on, and in accordance with, any one or more or all of the conditions and criteria discussed above.

The, e.g., compiler, may use any suitable and desired technique and process in order to select and set eviction priority indications for instructions in a program to be executed for operation in the manner of the technology described herein.

The, e.g., compiler, may thus, e.g., look at the dependencies of instructions in the program, the results that instructions will generate and the inputs (operands) that they will use, etc., in order to select and set eviction priority indications for instructions for operation in the manner of the technology described herein.

The, e.g., compiler, is in an embodiment then operable to and configured to associate the selected indication with an instruction, e.g., and in an embodiment, as part of the encoding for the instruction, in or with the compiled program that is provided to the execution unit of the data processor for execution.

Thus, in an embodiment, a compiler for the data processor:

for a program comprising a set of instructions to be executed by the execution unit of the data processor:
  determines for at least one instruction in the program to be executed by the execution unit of the data processor, a priority for eviction from the buffer of an output data value that will be generated when executing the instruction; and
  associates with the at least one instruction in the program to be executed by the execution unit of the data processor, an indication representative of the determined priority for eviction from the buffer for the output data value that will be generated when executing the instruction.

In embodiments, the, e.g., compiler may also re-order instructions in the program so as to, for example, increase the likelihood that an output data value from an instruction will be able to be used from the buffer before it falls to be evicted from the buffer.

The, e.g., compiler, may run on a host processor of the data processing system. The data processor that is to execute the program may be another processor, such as a graphics processor, that is associated with the host processor, such that the compiler and compiled program run on separate processors of the overall data processing system. However, other arrangements would be possible, such as the compiler running on the same processor as the compiled program, or the compiler being run on a (completely) separate processor, such as the program being precompiled on a separate system and being distributed in a compiled form.

The technology described herein also extends to the operation of a compiler in the manner of the technology described herein.

Thus, another embodiment of the technology described herein comprises a method of compiling a program to generate instructions for a data processor in which execution threads may execute program instructions to perform data processing operations, the data processor comprising:

an execution unit operable to execute instructions in a program to be executed to perform data processing operations for execution threads executing the program; and
storage operable to store data values for use by the execution unit when executing an instruction to perform a data processing operation for an execution thread and to store output data values generated by the execution unit when performing a data processing operation for an instruction being executed by an execution thread;
the data processor further comprising:
  a buffer intermediate between the storage and the execution unit, the buffer being operable to receive data values from the storage and to provide data values to the execution unit for use when executing an instruction, and to receive output data values from the execution unit for writing to the storage; and
  a buffer controller configured to select data values in the buffer for writing to the storage and to trigger the writing of selected data values from the buffer to the storage;
the method comprising:
for a program comprising a set of instructions to be executed by the execution unit of the data processor:
  determining for at least one instruction in the program to be executed by the execution unit of the data processor, a priority for eviction from the buffer of an output data value that will be generated when executing the instruction; and
  associating with the at least one instruction in the program to be executed by the execution unit of the data processor, an indication representative of the determined priority for eviction from the buffer for the output data value that will be generated when executing the instruction.

Another embodiment of the technology described herein comprises a compiler that compiles programs to generate instructions for a data processor in which execution threads may execute program instructions to perform data processing operations, the data processor comprising:

an execution unit operable to execute instructions in a program to be executed to perform data processing operations for execution threads executing the program; and
storage operable to store data values for use by the execution unit when executing an instruction to perform a data processing operation for an execution thread and to store output data values generated by the execution unit when performing a data processing operation for an instruction being executed by an execution thread;
the data processor further comprising:
  a buffer intermediate between the storage and the execution unit, the buffer being operable to receive data values from the storage and to provide data values to the execution unit for use when executing an instruction, and to receive output data values from the execution unit for writing to the storage; and
  a buffer controller configured to select data values in the buffer for writing to the storage and to trigger the writing of selected data values from the buffer to the storage;
the compiler comprising a processing circuit configured to:
for a program comprising a set of instructions to be executed by the execution unit of the data processor:

determine for at least one instruction in the program to be executed by the execution unit of the data processor, a priority for eviction from the buffer of an output data value that will be generated when executing the instruction; and associate with the at least one instruction in the program to be executed by the execution unit of the data processor, an indication representative of the determined priority for eviction from the buffer for the output data value that will be generated when executing the instruction.

As will be appreciated by those skilled in the art, these embodiments of the technology described herein can, and in an embodiment do, include any one or more or all of the features of the technology described herein described herein, as appropriate.

Once the instructions in the program have been appropriately associated with indications of priority for eviction of output data values from the buffer, the program can be provided to the data processor (to the execution unit of the data processor) for execution. The data processor will then execute the program, including executing the instructions in the program.

The provision of the program to the data processor, and the execution of the program by the data processor (by an execution unit or units of the data processor) can be done in any suitable and desired manner, e.g., and in an embodiment, in accordance with the normal operation of the data processor and data processing system in question.

Thus the execution unit will, for example, and in an embodiment, execute instructions in the program in turn, including reading input (operand) data values from the buffer and performing processing operations using those input data values, and then writing output data values generated by executing an instruction to the buffer.

In accordance with the technology described herein, when the execution of an instruction causes a data value to be written to the buffer, a priority for eviction indication for the data value is also written to the corresponding entry in the buffer where the data value is stored (so as to be associated with the output data value in the buffer). Again, this can be done in any suitable and desired manner, e.g. in accordance with the normal operation of the data processor in question for updating the buffer with output data values when executing instructions of a program.

The priority eviction indication for a data value that is written to the corresponding entry in the buffer where the data value is stored can be the priority for eviction indication that was associated with the instruction (and in one embodiment that is the case), or it could be a priority for eviction indication that is derived from (but, e.g., not identical to) the priority for eviction indication associated with the instruction itself.

Subject to the operation in the manner of the technology described herein when selecting data values (entries) for eviction from the buffer, the operation of the buffer in terms of loading data values from the storage (register file) for use by an execution unit, and returning output data values from the execution unit via the buffer to the storage (register file) can be performed in any suitable and desired manner, and, e.g. and in an embodiment, in accordance with the existing operation and protocols of the data processor in question.

Thus, for example, input data values to be used by an execution unit will be appropriately loaded from the storage (e.g. register file) into the buffer, e.g. and in an embodiment, in accordance with the existing data fetching operation of the data processor, and once those data values are present in the buffer, then the execution unit will perform the appropriate processing operation using those data values. Correspondingly, an output data value generated by the execution unit will be written to the buffer, and then, if required, written back to the storage (register file) from the buffer (but in accordance with the operation in the manner of the technology described herein for selecting data values to evict from the buffer).

In this operation, when executing a program, while there remains space in the buffer for new data values (there are free (available) data value entries), then any new input or output data values to be written to the buffer can simply be written into an appropriate free (available) entry in the buffer.

However, there will be situations where there are no free entries in the buffer for a new data value (whether for an input data value to be used by an instruction or an output data value generated by an instruction), and in that case it will be necessary to evict an existing data value (entry) from the buffer to provide room for the new data value to be written into the buffer. In accordance with the technology described herein, when a data value (entry) is to be evicted from the buffer (e.g. to provide space in the buffer for a new data value), the buffer controller selects a data value (entry) in the buffer to evict using, at least in part, any stored indications of priority for eviction from the buffer associated with data values (entries) stored in the buffer.

The eviction process may, and in an embodiment does, comprise first writing the data value(s) that is being evicted to the storage (register file) (and then marking the entry in the buffer for that evicted data value(s) as being free (available for use)). This is in an embodiment done at least for some, in an embodiment particular, in an embodiment selected, data value evictions, e.g., and in an embodiment, where it is known that the data value will be needed in the future and/or by another unit, etc., of the data processor.

In an embodiment, the eviction process can comprise, at least for some, in an embodiment particular, in an embodiment selected, data value evictions, simply marking an existing data value entry as being free (available for use), without writing any data value stored in that data entry back to the storage (register file). This may be suitable where, for example, a data value has been used from the buffer and is no longer required, so that it is not in fact necessary to write the data value to the storage for retention for future use, and/or where it is known that data value in the buffer is the same as a copy of that value that is already stored in the storage (register file).

Evicting a data value from the buffer in an embodiment comprises, in effect, evicting the entry in the buffer where the data value is stored. Thus, the eviction process will comprise making the buffer entry where the data value was stored available for use (marking it as free). Thus, where appropriate, the data value(s) in the buffer entry will be written back to the storage (register file) and then the buffer entry will be marked as being available for use (free).

In an embodiment, the buffer controller is configured to, when there is a free (spare) write cycle to the storage from the buffer, determine whether any entries in the buffer should be written to the storage in that (spare) write cycle using, at least in part, the eviction priority indications associated with the entries in the buffer. This is in an embodiment in addition to the operation of selecting and evicting a data entry when space for a new data entry needs to be made available in the buffer. This would then allow the buffer controller to, in effect, drain appropriate data entries from the buffer in advance using spare buffer to storage write cycles, so as to, potentially, make entries available in the buffer for new data in advance of that new data arriving.

Thus in an embodiment, the buffer controller operates to, and is configured to:

determine whether there is a write operation from the buffer to the storage available in the current cycle that is not already required for a buffer to the storage write operation, and to, when it is determined that a write operation from the buffer to the storage is available and not already required for a buffer to the storage write operation:

select a data value (entry) to write from the buffer to the storage using the available write operation using, at least in part, any eviction priority indications associated with data values in the buffer; and write the selected data value (entry) from the buffer to the storage using the available write operation.

The eviction priority indications associated with and stored for the data values (entries) in the buffer can be used (e.g. by the buffer controller) when selecting a data value (entry) to evict from the buffer in any suitable and desired manner.

In an embodiment, the buffer controller uses the eviction priority indications to identify the data values (entries) in the buffer having the highest indicated priority for eviction (of the data values (entries) in the buffer), and then selects one of the data entries having the highest indicated priority for eviction for eviction. In the case where there are plural data values (entries) in the buffer all having the same highest indicated priority for eviction (of the data values (entries) in the buffer), then the buffer controller should, and in an embodiment does, select one of those plural data values (entries) for eviction. This selection could be based on any suitable and desired criteria, such as simply selecting the first data value (entry) in the buffer having the highest indicated priority level for eviction, or, in an embodiment, use a more sophisticated eviction selection scheme to select from among the plural data values (entries) all having the same (highest) indicated priority level for eviction, such as, and in an embodiment, using a least recently used (LRU) eviction policy to select which of the plural data values (entries) all having the highest indicated priority for eviction to evict from the buffer.

Thus, for example, in the case where each data value (entry) in the buffer can have one of two eviction level priorities, a higher and lower priority level, the buffer controller will identify any data values (entries) in the buffer indicated as having the higher level of priority for eviction, and then select one of those data values (entries), in an embodiment using a least recently used protocol, to evict from the buffer.

Correspondingly, for example, in the case where each data value (entry) in the buffer can have one of four eviction level priorities, the buffer controller will identify the data values (entries) in the buffer having the highest indicated one of the four levels of priority for eviction (so the highest level, if any entries having the highest priority level exist, but the next to highest priority level if no entries having the highest priority level exist, but entries having the next to highest level exist (and so on)), and then select one of those data values (entries), in an embodiment using a least recently used protocol, to evict from the buffer.

Where the eviction priority indications indicate more than a relative level of priority for eviction for a data value (entry) in the buffer, then the buffer controller can use that information in any suitable and desired manner. For example, in the case where the eviction priority indications indicate how far ahead in the instruction execution any reuse of the data value will occur, the buffer controller could, and in an embodiment does, take that information into account when selecting a data value (entry) to evict from the buffer. For example, and in an embodiment, the buffer controller could operate to preferentially evict from the buffer data values (entries) that are indicated as being reused further ahead in execution of the program relative to other data values (entries) in the buffer.

It would also be possible for the execution unit itself to include processing logic (hardware (circuit)) that can itself (attempt to) determine whether data values (entries) in the buffer will be reused during execution of the program, for example by being operable to fetch instructions in advance of execution (to fetch ahead in the instruction stream) to thereby analyse what input data values (operands) future instructions in the instruction stream will use. This information could then be, e.g., combined with the eviction priority indications provided with the instructions to, e.g., give more sophisticated selection and eviction of data values (entries) from the buffer.

Other arrangements would, of course, be possible.

These arrangements are in an embodiment at least used where it is necessary to evict a data value (entry) from the buffer in order to allow a new value (entry) to be stored in the buffer. They could also be used in the case where, as discussed above, buffer entries are also evicted using available spare write cycles. Alternatively, in the latter case, a different eviction selection policy could be used, such as, for example, only evicting data values (entries) that have the highest indicatable level of priority for eviction from the buffer using "spare" buffer to storage write cycles (such that if there are no data values (entries) in the buffer indicated as having the highest indicatable priority for eviction, then no data values (entries) would be evicted from the buffer in a spare write cycle, even if a spare write cycle was available).

The technology described herein also extends to the particular operation of the execution unit, buffer and buffer controller in the manner of the technology described herein. Thus, another embodiment of the technology described herein comprises a method of operating a data processor in which execution threads may execute program instructions to perform data processing operations, the data processor comprising:

an execution unit operable to execute instructions in a program to be executed to perform data processing operations for execution threads executing the program; and storage operable to store data values for use by the execution unit when executing an instruction to perform a data processing operation for an execution thread and to store output data values generated by the execution unit when performing a data processing operation for an instruction being executed by an execution thread;

the data processor further comprising:

a buffer intermediate between the storage and the execution unit, the buffer being operable to receive data values from the storage and to provide data values to the execution unit for use when executing an instruction, and to receive output data values from the execution unit for writing to the storage; and a buffer controller configured to select data values in the buffer for writing to the storage and to trigger the writing of selected data values from the buffer to the storage;

the method comprising:
the execution unit of the data processor, when executing an instruction in a program being executed by the data processor that has an associated indication representative of a priority for eviction from the buffer of an output data value that will be generated when executing the instruction:
writing into the buffer:
an output data value generated when executing the instruction and an indication representative of the priority for eviction from the buffer for the output data value associated with the instruction;
and
the buffer controller, when a data value is to be evicted from the buffer:
selecting a data value to evict from the buffer using, at least in part, any indications representative of a priority for eviction from the buffer stored with data values in the buffer;
and
evicting the selected data value from the buffer.

Another embodiment of the technology described herein comprises a data processor in which execution threads may execute program instructions to perform data processing operations, the data processor comprising:
an execution unit operable to execute instructions in a program to be executed to perform data processing operations for execution threads executing the program; and
storage operable to store data values for use by the execution unit when executing an instruction to perform a data processing operation for an execution thread and to store output data values generated by the execution unit when performing a data processing operation for an instruction being executed by an execution thread;
the data processor further comprising:
a buffer intermediate between the storage and the execution unit, the buffer being operable to receive data values from the storage and to provide data values to the execution unit for use when executing an instruction, and to receive output data values from the execution unit for writing to the storage; and
a buffer controller configured to select data values in the buffer for writing to the storage and to trigger the writing of selected data values from the buffer to the storage;
wherein:
the execution unit of the data processor is further configured to, when executing an instruction in a program that has an associated indication representative of a priority for eviction from the buffer of an output data value that will be generated when executing the instruction:
write into the buffer:
an output data value generated when executing the instruction and an indication representative of the priority for eviction from the buffer for the output data value associated with the instruction; and
the buffer controller is further configured to, when a data value is to be evicted from the buffer:
select a data value to evict from the buffer using, at least in part, any indications representative of a priority for eviction from the buffer stored with data values in the buffer;
and
evict the selected data value from the buffer.

As will be appreciated by those skilled in the art, these embodiments of the technology described herein can, and in an embodiment do, include any one or more or all of the features of the technology described herein described herein, as appropriate.

Thus, for example, the buffer controller in an embodiment operates to evict data values from the buffer using the associated indications of priority for eviction from the buffer in one or more or all of the manners discussed above.

The result or results generated by executing the program may be used as desired. For example, they may be output, e.g. to memory. In all cases, the result(s) may be used by the data processor and data processing system as generated output. The output that is generated by the data processor can be any suitable and desired output, such as in the case of a graphics processor, a render output, such as a frame (image) to be displayed, a texture (in a render-to-texture) operation, etc.

In some embodiments, the data processor comprises, and/or is in communication with, one or more memories and/or memory devices that store the data described herein, and/or store software for performing the processes described herein. The data processor may also be in communication with a host microprocessor, and/or with a display for displaying images based on the data generated by the data processor.

In an embodiment, the data processor is part of an overall data processing system that comprises one or more memories and/or memory devices and a host processor (and, optionally, a display). In an embodiment, the host microprocessor is operable to execute applications that require data processing by the data processor, with the data processor operating in the manner of the technology described herein when required to process data by applications executing on the host processor.

Other arrangements would, of course, be possible.

The technology described herein can be used for all forms of output that a data processor (and processing pipeline) may be used to generate. For example, in the case of graphics processing, the graphics processing pipeline may generate frames for display, render to texture outputs, etc. The output data values from the processing are in an embodiment exported to external, e.g. main, memory, for storage and use, such as to a frame buffer for a display.

The technology described herein is applicable to any suitable form or configuration of data processor and data processing system. In an embodiment, the various functions of the technology described herein are carried out on a single data processing platform that generates and outputs data.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuits, circuitry, processing logic, microprocessor arrangements, etc., that are operable to perform the various functions, etc., such as appropriately dedicated hardware elements (processing circuits) and/or programmable hardware elements (processing circuits) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits, etc., if desired.

Subject to any hardware necessary to carry out the specific functions discussed above, the data processing system and processor can otherwise include any one or more or all of the usual functional units, etc., that data processing systems and processors include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code configured to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a processor, renderer or microprocessor system comprising data processor causes in conjunction with said data processor said processor, renderer or microprocessor system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described in the context of a graphics processor operable to execute graphics shader programs.

FIG. 1 shows a typical computer graphics processing system.

An application 2, such as a game, executing on a host processor 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 5 that is executed by the graphics processor 3 in the present embodiments in more detail.

The graphics processing pipeline 5 shown in FIG. 2 is a tile based renderer and will thus produce tiles of a render output data array, such as an output frame to be generated.

(In tile based rendering, rather than the entire render output, e.g., frame, effectively being processed in one go as in immediate mode rendering, the render output, e.g., frame to be displayed, is divided into a plurality of smaller sub regions, usually referred to as "tiles". Each tile (sub region) is rendered separately (typically one after another), and the rendered tiles (sub regions) are then recombined to provide the complete render output, e.g., frame for display. In such arrangements, the render output is typically divided into regularly sized and shaped sub regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 5 that are relevant to the operation of the present embodiments. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuits (processing logic), etc., for performing the necessary operation and functions.

As shown in FIG. 2, the graphics processing pipeline 5 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher order representations of the hull, the domain shader 23 performs operations on vertices output by the tessellation stage (similar to a vertex shader), and the geometry shader 24 processes entire primitives such as a triangles, points or lines. These stages together with the vertex shader 20 effectively perform all the necessary fragment frontend operations, such as transformation and lighting operations, and primitive setup, to setup the primitives to be rendered, in response to commands and vertex data provided to the graphics processing pipeline 5.

The rasterisation stage 25 of the graphics processing pipeline 5 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z buffer within the tile buffer 30. (The tile buffer stores colour and depth buffers that store an appropriate colour, etc., or Z value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 5 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 5 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler 6 to binary code for the target graphics processing pipeline 5. This may include the creation of one or more intermediate representations of the program within the compiler.

The compiler 6 may, e.g., run on the host processor 1 of the data processing system that includes the graphics processor 3. (The compiler 6 may, e.g., be part of the driver 4, with there being a special API call to cause the compiler to run. The compiler execution can thus be part of the draw call preparation done by the driver in response to API calls generated by an application).

However, other arrangements would be possible, such as the compiler running on the same processor as the compiled code, or the compiler being run on a separate processor, such as the program being pre-compiled on a separate system and being distributed in a compiled form.

FIG. 2 shows schematically the operation stages of the graphics processor 3.

Figure 3:
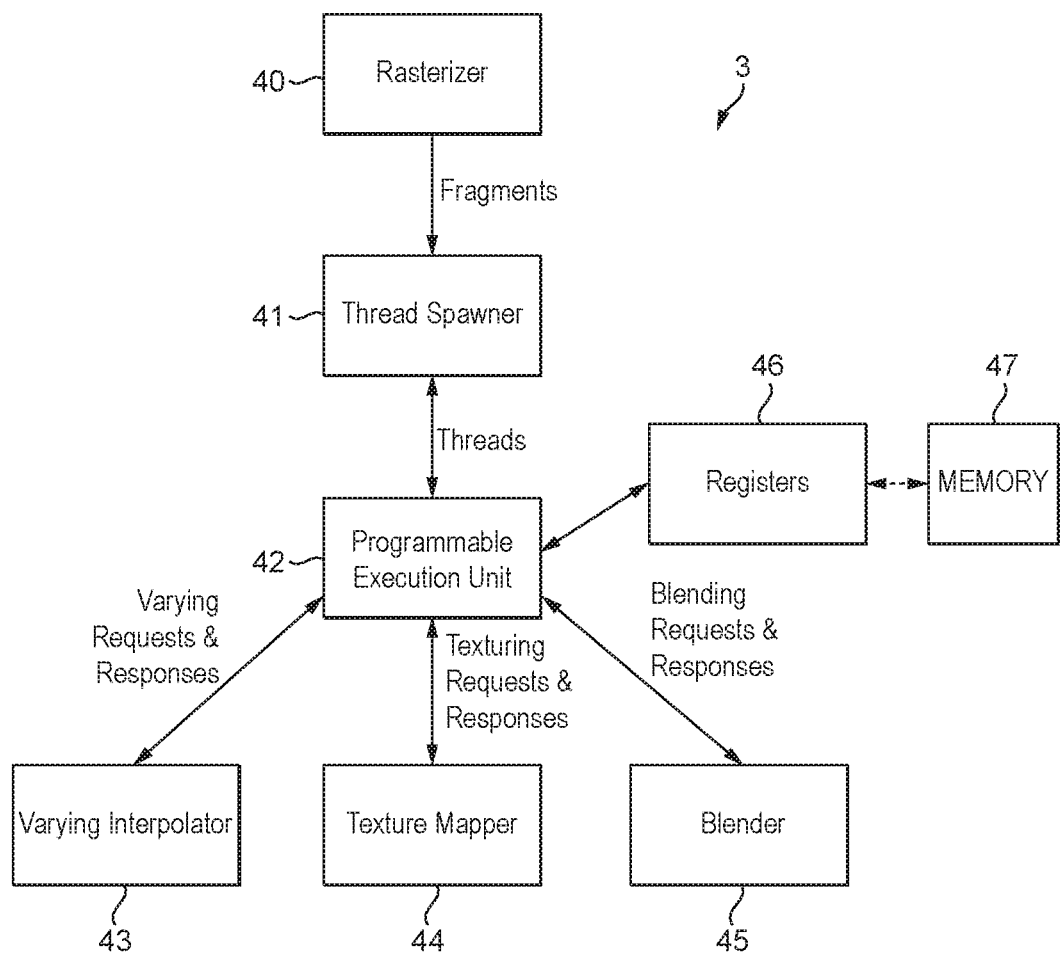
FIG. 3 shows schematically a graphics processor.

FIG. 3 shows functional units of the graphics processor 3 that are used to perform (and thus to act as) various ones of the processing operations and stages of the graphics processing pipeline 5 shown in FIG. 2. (There may be other functional units in the graphics processor 3.)

As shown in FIG. 3, the graphics processor 3 includes a rasteriser 40, a thread spawner 41, a programmable execution unit 42, a varying interpolator 43, a texture mapper 44, a blender 45, and storage in the form of a set of registers 46, in communication with memory 47 of the data processing system.

The thread spawner 41 is operable to spawn execution threads for execution by the programmable execution unit 42, e.g. for fragments that it receives from the rasteriser 40.

The programmable execution unit 42 operates to execute shader programs to perform the shader operations of the graphics processing pipeline, such as the hull shader, the vertex shader and the fragment shader. To do this, it receives execution threads from the thread spawner 41 and executes the relevant shader program for those execution threads. As part of this operation, and as shown in FIG. 3, the execution threads will read data from and write data to respective registers of the storage (register file) 46.

As part of this processing, and as shown in FIG. 3, the programmable execution unit 42 can call upon the varying interpolator 43, the texture mapper 44 and the blender 45 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 43 operates to interpolate values across graphics primitives, and, as part of this operation, often creates texture coordinates to be used for sampling graphics textures.

The texture mapper 44 operates to sample graphics textures using texture coordinates, e.g. generated by the varying interpolator 43, and produces therefrom a filtered texture sample result (which it can then return to the programmable execution unit 42 for use, e.g. when shading sampling points).

The blender 45 operates to blend, e.g., fragment shading results generated by the programmable execution unit 42 with previously generated fragment shader results, such as results that are already stored in the tile buffer and/or the frame buffer.

As discussed above, the programmable execution unit 42 executes shader programs to be executed for execution threads that it receives from the thread spawner 41 to perform graphics processing operations.

Figure 4:
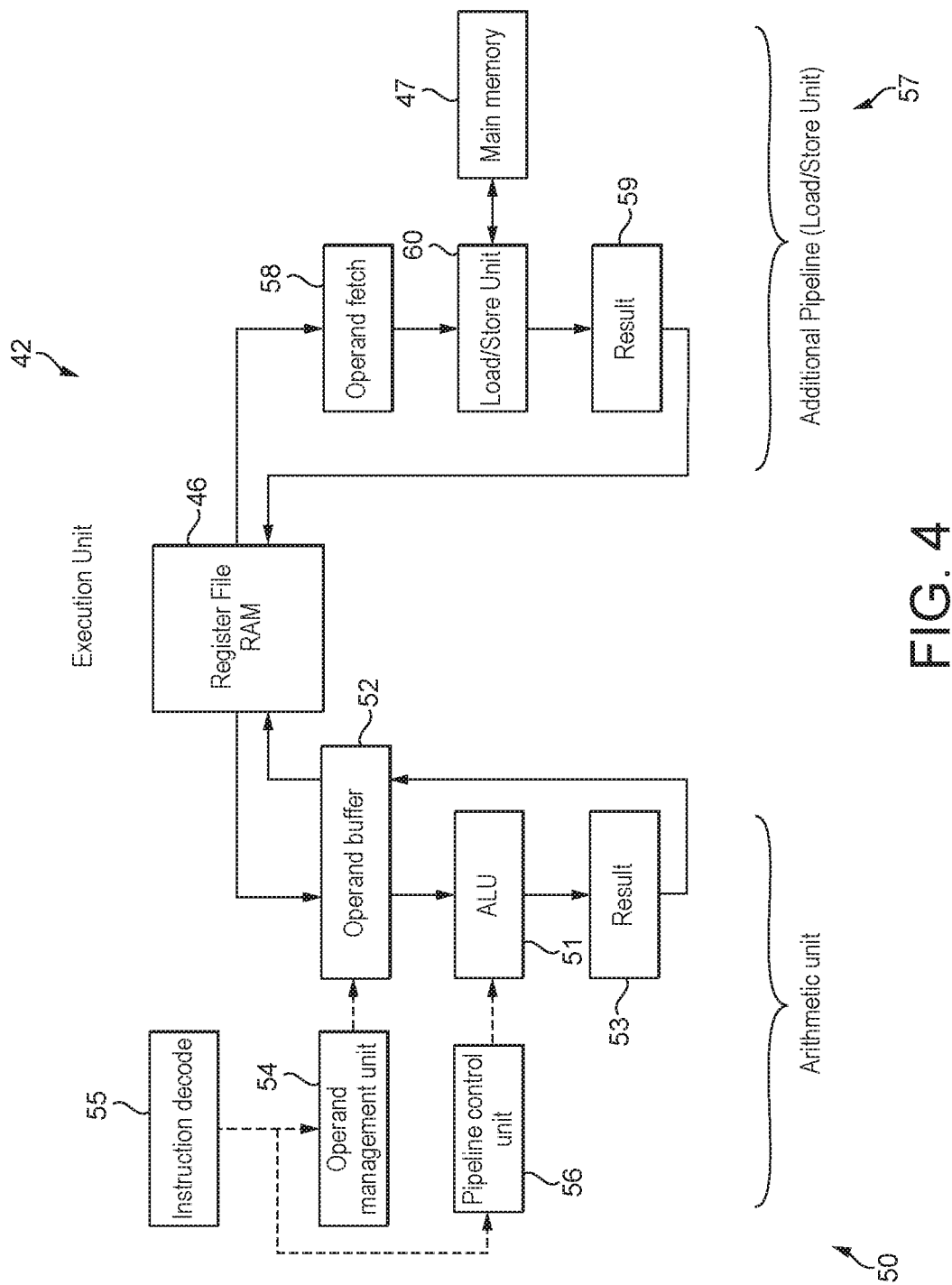
FIG. 4 shows an embodiment of an execution unit for a graphics processor.

FIG. 4 shows an embodiment of the programmable execution unit 42 of the graphics processor 3 shown in FIG. 3 that is operable in accordance with the technology described herein.

As shown in FIG. 4, the execution unit 42 includes an arithmetic pipeline 50 that includes, inter alia, one or more functional units in the form of arithmetic logic units 51 that are operable to perform arithmetic operations on input data values to provide appropriate output data values 53 in response to instructions requiring arithmetic operations in a program being executed by the execution unit 42.

As shown in FIG. 4, the arithmetic pipeline 50 includes, inter alia, an operand buffer 52 that is intermediate between the register file 46 and the arithmetic logic units 51, and that is operable to store input data values (operands) from the register file 46 for use by the arithmetic logic units 51, and also, as shown in FIG. 4, to store output data values (results) 53 generated by performing arithmetic operations (which output data values can then correspondingly be written back from the operand buffer 52 to the register file 46). The register file 46 may, e.g. have 64 entries, with the operand buffer having, e.g., fewer, e.g. 8 entries.

In order to facilitate this operation, the arithmetic pipeline 50 also includes an appropriate operand buffer controller (operand management unit) 54 that is operable to control the loading of data values into the operand buffer 52 and the writing of data values out from the operand buffer 52 back to the register file 46 (the eviction of data values from the operand buffer 52). This operation will be discussed in more detail below.

The arithmetic pipeline 50 also includes an appropriate instruction decode circuit 55, and a pipeline control unit 56 that is operable, inter alia, to cause the arithmetic logic units 51 to perform the required arithmetic operations in response to instructions in a program being executed.

As shown in FIG. 4, the execution unit 42 also includes a load/store pipeline (unit) 57 that is operable to fetch data values from the main memory 47 for loading into the register file 46, and also to write data values from the register file 46 to the main memory 47. To facilitate this, the load/store unit 57 includes an appropriate operand fetch circuit 58 operable to fetch data values from the register file 46 for writing into the main memory 47, a corresponding result writing circuit 59 operable to write data values fetched from the main memory 47 into the register file 46, and an appropriate load/store unit 60 (circuit) operable to load data values from, and store data values in, the main memory 47.

As shown in FIG. 4, the execution unit 42 includes an operand buffer 52 intermediate between the register file 46 and the arithmetic logic units 51 of the arithmetic pipeline 50, which operand buffer 52 is operable to store input data values for use by the arithmetic logic units 51 and also output (result) data values 53 generated by the arithmetic logic units 51.

Figure 5:
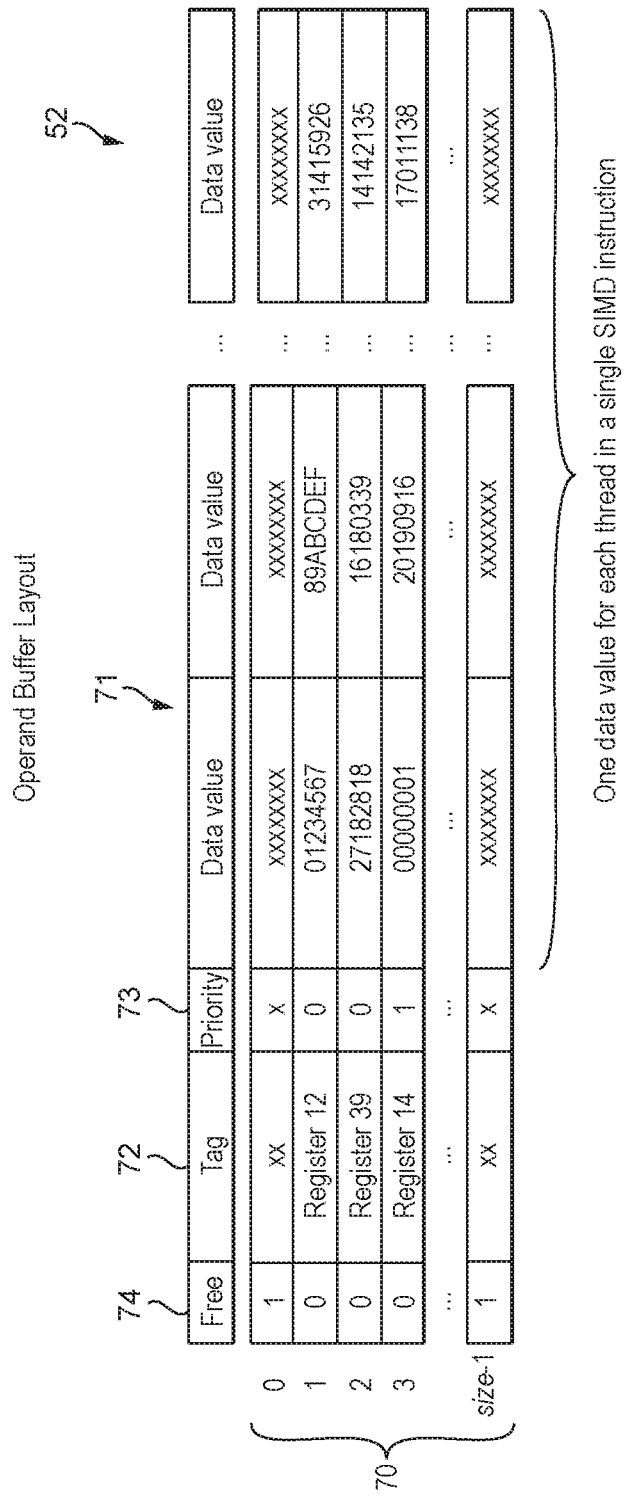
FIG. 5 shows an embodiment of a buffer used in embodiments of the technology described herein.

FIG. 5 shows an example configuration for the operand buffer 52.

As shown in FIG. 5, the operand buffer 52 includes a number of entries 70, each of which can store a respective data value 71 for each thread that is executing a given instruction in lockstep, and is identified by means of a tag 72 (which allows the data values stored in the entry to be identified).

Thus, in the present embodiment, each entry 70 in the operand buffer 52 stores the data value from (or for) a particular register for each thread in a group of threads that is executing a given instruction in parallel (in lockstep).

Correspondingly the tag 72 for a data entry 70 is the register index of the register from which the set of data values in the buffer entry has been fetched (in the case of input data values) or to which the set of data values in the buffer entry 70 should be stored (in the case of an output data value generated by executing an instruction). Thus for each thread in the group of threads, the buffer entry 70 will store the particular data value for that thread from or for the corresponding register for that thread.

Each buffer entry 70 also has an associated "free" flag 74 that can be set to indicate that the buffer entry is free (is available) to store a new data value.

In accordance with the technology described herein, in the present embodiment, the operand buffer 52 also stores for each data value entry 70, a priority for eviction from the operand buffer indication, in the form of an eviction priority flag 73. These eviction priority flags 73 are used by the operand management unit (controller) 54 when selecting a data value (and entry 70) to evict from the operand buffer 52. This operation will be discussed in more detail below.

In use of the operand buffer 52, when an arithmetic logic unit 51 generates an output data value that is to be written to the operand buffer 52, that data value is written into an entry 70 in the operand buffer 52 together with an eviction priority indication that was associated with the instruction that produced the output data value. Thus, when writing an output value from the arithmetic logic units 51 to the operand buffer 52, the output data value will be written into the appropriate data value field in the operand buffer entry 70, and an eviction priority indication associated with the instruction that produced the output data value will be written into the eviction priority flag field 73 for the operand buffer entry 70 in question. (It would also be possible to write an eviction priority indication into the eviction priority flag field 73 for the operand buffer entry 70 in question that is derived from (but not identical to) the eviction priority indication associated with the instruction that produced the output data value, if desired.)

In order to trigger this operation, instructions in shader programs to be executed by the execution unit 42 can have associated with them operand buffer eviction priority indications. Thus the instruction encoding includes an eviction priority indication in the form of an eviction priority flag that can then be used to set the corresponding eviction priority flag 73 in the operand buffer 52.

Figure 6:
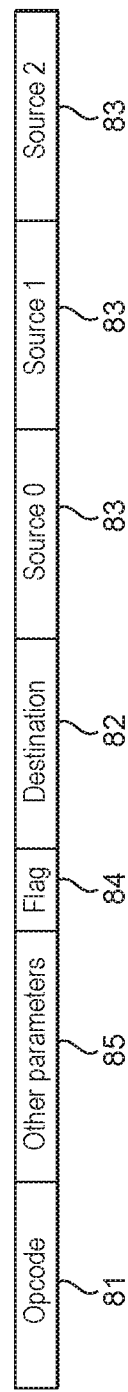
FIG. 6 shows instruction encoding used in embodiments of the technology described herein.

FIG. 6 shows the instruction encoding that is used in the present embodiments for this purpose. Thus, as shown in FIG. 6, the instructions to be executed by the execution unit 42 will include, inter alia, an opcode 81, a destination register index 82 indicating where the output value generated by the instruction should be written, appropriate source register indexes 83 indicating where the input data values for the instruction should be read from, and, in accordance with the technology described herein, an operand buffer eviction priority indication in the form of an eviction priority flag 84. As shown in FIG. 6, an instruction 80 can also include other desired parameters 85, e.g. in accordance with the particular instruction set architecture for the data processor and data processing system in question.

In the present embodiment, the eviction priority indications (flags) 84 that are associated with instructions comprise a single bit indication (flag) that can thus be used to indicate one of two relative priority levels for eviction from the operand buffer (a higher priority for eviction and a lower priority for eviction). Other arrangements, such as a two-bit indication (flag) that could be used to indicate any one of four priority levels for eviction, and/or eviction priority indications that provide other forms of information that can be used to determine a priority for eviction from the buffer of a data value (such as an indication of how many instructions in the program execution it will be before the output from the instruction will be used (if at all)) could also or instead be used if desired.

The eviction priority flags 84 are included in the instructions 80 to be executed by the execution unit 42 by the compiler (by the compilation process) when compiling the shader program for execution by the execution unit 42 of the graphics processor 3.

(An application 2 requiring graphics processing will provide shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. The compiler 6 may, e.g., be part of the driver 4, with there being a special API call to cause the compiler to run. The compiler execution can thus be seen as being part of the draw call preparation done by the driver in response to API calls generated by an application. (Other compiler arrangements would, of course, be possible.)

Figure 7:
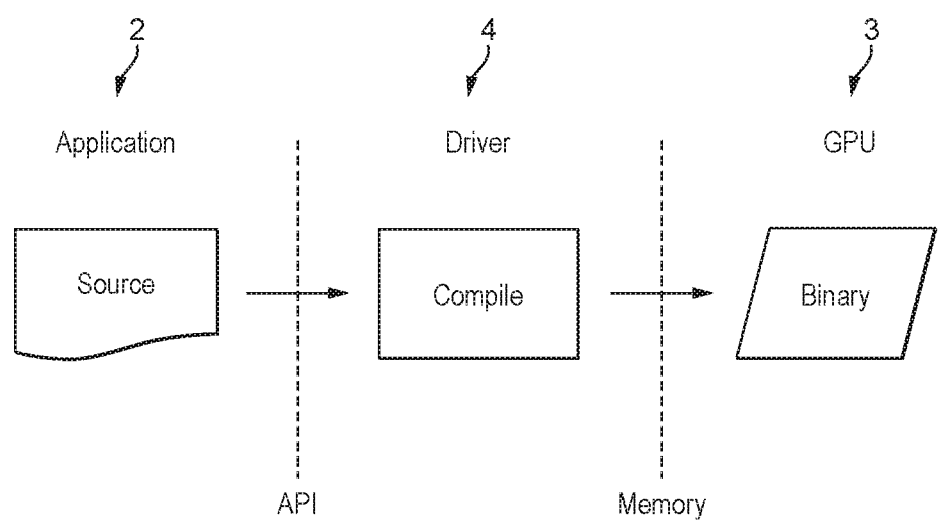
FIG. 7 illustrates shader program compilation.

FIG. 7 illustrates this, and shows a shader program being provided in the high level shader programming language by an application 2 to the driver 4, which then compiles the shader program to the binary code for the graphics processor.)

Figure 8:
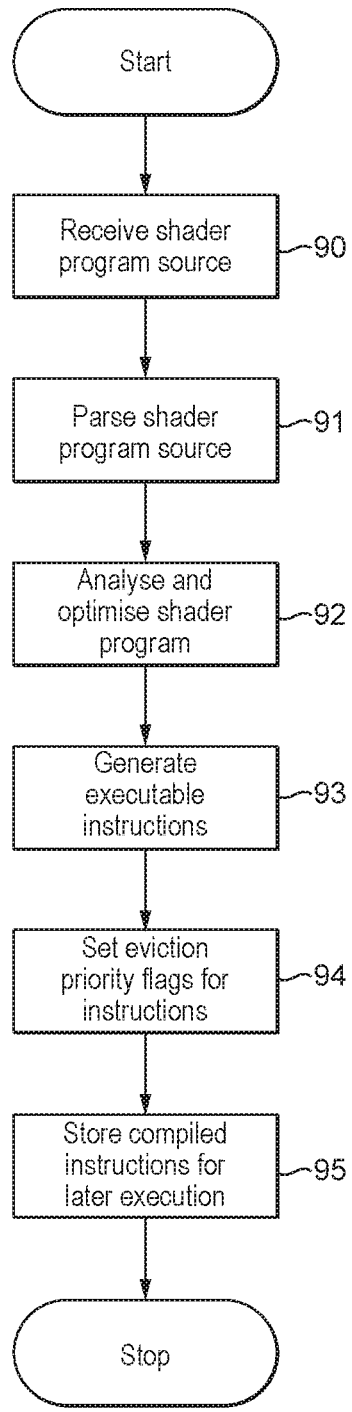
FIG. 8 shows an embodiment of shader program compilation.

FIG. 8 shows the compilation process in the present embodiments.

As shown in FIG. 8, the compiler 6 receives a source shader program to be compiled (step 90). The compiler will then parse the source shader program (step 91), analyse and optimise the shader program (step 92), and generate executable instructions for providing to the graphics processor to execute the shader program (step 93). As part of this processing, the compiler will assess, inter alia, the use of output data values generated by instructions in the shader program, and determine therefrom appropriate eviction priorities for the output values generated by the instructions, and set the eviction priority flags for instructions in the shader program accordingly (step 94).

In the present embodiments, an instruction is associated with an indication indicating a higher priority for eviction from the operand buffer 52 for an output data value that will be generated when executing the instruction, if the output data value will be required outside the execution unit 42 that is executing the instruction, e.g. is to be passed to other parts/units of the graphics processor and/or to be written out to (main) memory of or for the graphics processor.

Correspondingly, an output data value that will be used (consumed) only by the program being executed and/or within the execution unit that is executing the instruction (program) is marked as being a lower priority for eviction from the buffer.

In the present embodiments, instructions are set as a low (a lower) priority for eviction unless they are identified as being suitable to be set for a higher priority for eviction (i.e. the "default" setting is a low priority for eviction).

Figure 9:
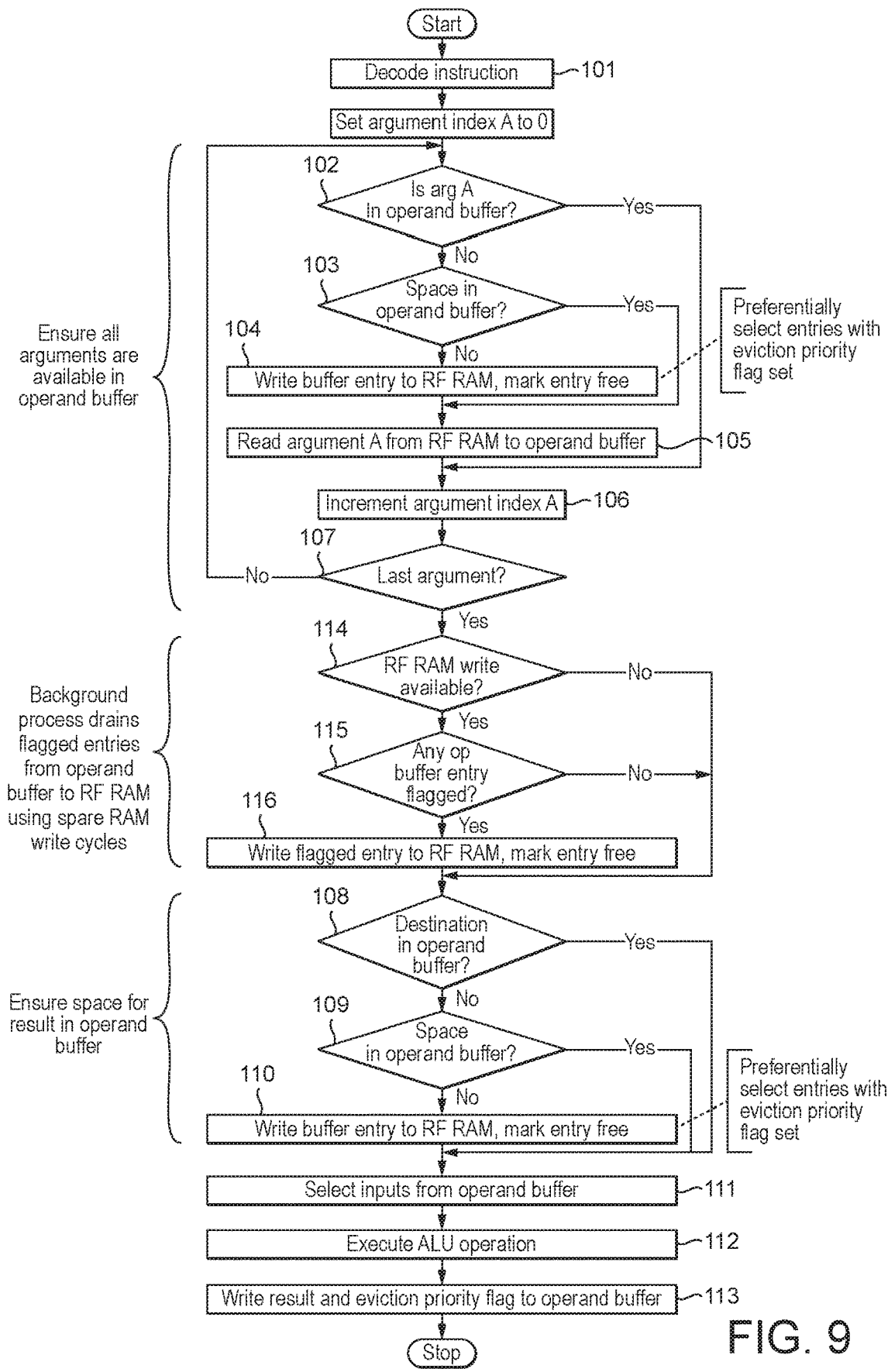
FIG. 9 shows schematically the operation of an execution unit of a graphics processor in embodiments of the technology described herein.

The compiled shader program instructions are then stored for later execution (for issuing to the graphics processor 3 for execution) (step 95). FIG. 9 shows the execution of instructions in a program by the execution unit 42 in an embodiment of the technology described herein. This Figure illustrates, in particular, the use of the eviction priority flags 73 to control and select the eviction of entries in the operand buffer 52 by the operand management unit (buffer controller) 54.

As shown in FIG. 9, the instruction decode circuit 55 first decodes an instruction to be executed (step 101).

The operand buffer controller 54 will then operate to load the appropriate input data values (operands) from the registers 46 to the operand buffer 52 for use when executing the instruction.

To do this, as shown in FIG. 9, the operand buffer controller 54, for each input operand (argument) for the decoded instruction, determines whether there is an entry for storing the input operand already allocated in the operand buffer 52 (step 102). If there is, the process proceeds to the next input operand (argument) (steps 106 and 107), and so on.

On the other hand, if an entry for storing the input data value (operand) (argument) is not already present in the operand buffer 52, the operand buffer controller 54 then determines whether there is a free entry in the operand buffer that the data value can be stored in (step 103). If there is a free (available) entry in the operand buffer, then the input data value (argument) is read from the registers 46 and stored in the free entry (in one of the free entries) in the operand buffer 52 (step 105). The process then proceeds to the next input operand (argument) (steps 106 and 107), and so on.

On the other hand, if there is not space (a free entry) in the operand buffer 52 for the required new data value, then the operand buffer controller 54 must first evict an entry from the operand buffer 52 to provide a free entry for storing the new data value (step 104). The instruction execution is stalled (paused) in the meantime.

To evict an entry from the operand buffer, the operand buffer controller 54 selects a data entry in the operand buffer 52 to evict, using, inter alia, the eviction priority flags 73 stored for the data entries 70 in the operand buffer 52.

In the present embodiment, the operand buffer controller 54 uses the eviction priority indications to identify the entries in the operand buffer 52 having the highest indicated priority for eviction (of the entries in the buffer), and then selects one of those entries indicated as having the highest priority of eviction for eviction, using a least recently used eviction policy to select which of the entries all having the highest indicated priority for eviction as being the data entry to evict from the buffer.

Thus, in the case where each entry 70 in the operand buffer can have one of two eviction level priorities, a higher and lower priority level, the operand buffer controller 54 will identify any entries in the buffer indicated as having the higher level of priority for eviction, and then select one of those entries to evict from the buffer using a least recently used protocol (or if there are no entries in the buffer indicated as having the higher level of priority for eviction, select one of the entries having the lower level of priority for eviction to evict from the buffer using a least recently used protocol).

Other arrangements would, of course, be possible.

Once an operand buffer entry has been selected for eviction, that buffer entry can then be evicted. The data values in the operand buffer entry to be evicted may first be written to the registers 46, e.g. if they will be required in the future. The selected operand buffer entry is then marked as being free (available), and so the new data values can be read from the registers 46 and stored in the newly freed operand buffer entry (step 105).

Again, the process then proceeds to the next input operand (argument), and so on, until all the input operands (arguments) for the instruction (for all the threads that are to execute the instruction in lock step) are present in the operand buffer 52 (step 107).

When loading input data values (operands/arguments) into the operand buffer in this manner, the eviction priority indications (flags) for the operand buffer entries where the input data values are stored are set to indicate the lowest indictable level of priority for eviction. (So in the present embodiment, where each entry 70 in the operand buffer can have one of two eviction level priorities, a higher and lower priority level, the eviction priority indications (flags) for the operand buffer entries where the input data values are stored are set to indicate the lower level of priority for eviction.) This helps to ensure that the input data values are retained in the operand buffer for use. (Once such input values have been used, such that they are no longer required, they (the entry) can be marked as "free", so it can be used for new data.)

Once all the input operands (arguments) for the instruction (for all the threads that are to execute the instruction in lock step) are present in the operand buffer 52 (step 107), the arithmetic operation for the instruction can then be executed. This is done by the arithmetic logic units 51 of the arithmetic pipeline 50 under the control of the pipeline control unit 56.

To do this, as shown in FIG. 9, the operand buffer controller 54 first determines whether there is an entry for storing the output data value that will be produced by the arithmetic operation for the instruction already allocated in the operand buffer 52 (step 108). If there is, the process proceeds to perform the arithmetic operation for the instruction in steps 111 to 113 (this will be discussed further below).

On the other hand, if an entry for storing the output data value is not already present in the operand buffer 52, the operand buffer controller 54 then determines whether there is a free entry in the operand buffer that the output data value can be stored in (step 109). If there is a free (available) entry in the operand buffer, then the process proceeds to perform the arithmetic operation for the instruction in steps 111 to 113 (this will be discussed further below).

On the other hand, if there is not space (a free entry) in the operand buffer 52 for the required new output data value, then the operand buffer controller 54 must first evict an entry from the operand buffer 52 to provide a free entry for storing the new output data value (step 110). The instruction execution is stalled (paused) in the meantime.

As discussed above, to evict an entry from the operand buffer, the operand buffer controller 54 selects a data entry in the operand buffer 52 to evict, using, inter alia, the eviction priority flags 73 stored for the data entries 70 in the operand buffer 52, in the manner discussed above in relation to step 104. Thus, the operand buffer controller 54 will identify any entries in the buffer indicated as having the higher level of priority for eviction, and then select one of those entries to evict from the buffer using a least recently used protocol (or if there are no entries in the buffer indicated as having the higher level of priority for eviction, select one of the entries having the lower level of priority for eviction to evict from the buffer using a least recently used protocol).

Once an operand buffer entry has been selected for eviction, that buffer entry can then be evicted. The data values in the operand buffer entry to be evicted may first be written to the registers 46, e.g. if they will be required in the future. The selected operand buffer entry is then marked as being free (available), so the new output data values can be stored in the newly freed operand buffer entry.

When (once) there is an operand buffer entry available for the output data value for the instruction, the execution unit performs the arithmetic operation for the instruction.

To do this, as shown in FIG. 9, the input data values for the arithmetic operation for the instruction are selected from the operand buffer 52 (step 111), the arithmetic logic units 51 then execute the appropriate operation using those input values (step 112), and the result of the arithmetic operation, together with the indicated eviction priority flag 84 for the instruction (or an eviction priority indication based on the indicated eviction priority flag 84 for the instruction), are written to the allocated entry in the operand buffer 52 (step 113).

The process can then proceed to the next instruction to be executed, and so on.

FIG. 9 also shows as steps 114-116, an exemplary, and optional, background process, where operand buffer entries can be evicted in any event from the operand buffer 52 to the registers 46 using spare "buffer to register file" write cycles. This would then facilitate, for example, draining entries from the operand buffer 52 when there is the opportunity to do so, so as to thereby increase the possibility of there being free entries in the operand buffer when required. This can operate as a background process to the operand buffer operation triggered by the execution of instructions.

As shown in FIG. 9, for this background process, it is first determined whether a write from the operand buffer 52 to the registers 46 is available (i.e. not otherwise being used) (step 114). If not, then the background eviction operation does not take place.

On the other hand, if there is a spare write operation available, then the operand buffer controller 54 determines whether any operand buffer entries are flagged as being the highest indicatable priority for eviction (step 115). If there is an operand buffer entry flagged as being the highest priority for eviction, then the operand buffer controller 54 selects the (or one of the) operand buffer entries flagged as being the highest priority for eviction (e.g. using an LRU policy), and writes that entry back to the registers 46 using the spare register write cycle (step 116). The corresponding operand buffer entry is then marked as being free (available).

(On the other hand, even if there is a spare write cycle, if none of the operand buffer entries is flagged as being the highest indicatable priority for eviction, no operand buffer entry is evicted using the spare write cycle (as shown in FIG. 9).)

This accordingly allows operand buffer entries that will, for example, need to be written back to the register file 46 in any event, to be evicted as a background process, thereby increasing performance and, e.g., saving energy.

It can be seen from the above that the technology described herein, in its embodiments at least, provides a more efficient mechanism for using a buffer that is intermediate between storage, such as a register file, and an execution unit executing instructions using values from and storing values in the storage (register file). This can then increase overall performance of the data processor, and, e.g., thereby save energy.

This is achieved, in the embodiments of the technology described herein at least, by associating with instructions eviction priority indications that provide "hints" to the buffer controller to assist the buffer controller when selecting data values for eviction from the buffer.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a data processing system, the data processing system comprising:
   a data processor in which execution threads may execute program instructions to perform data processing operations, the data processor comprising:
   an execution unit operable to execute instructions in a program to be executed to perform data processing operations for execution threads executing the program; and
   storage operable to store data values for use by the execution unit when executing an instruction to perform a data processing operation for an execution thread and to store output data values generated by the execution unit when performing a data processing operation for an instruction being executed by an execution thread;
   the data processor further comprising:
   a buffer intermediate between the storage and the execution unit, the buffer being operable to receive data values from the storage and to provide data values to the execution unit for use when executing an instruction, and to receive output data values from the execution unit for writing to the storage; and
   a buffer controller configured to select data values in the buffer for writing to the storage and to trigger the writing of selected data values from the buffer to the storage;
   the method comprising:
   for a first program comprising a set of instructions to be executed by the execution unit of the data processor:
   associating with at least one instruction in the first program an indication representative of a priority for eviction from the buffer of an output data value that will be generated when executing the at least one instruction;

the execution unit, when executing a first instruction in the first program that has an associated indication representative of a priority for eviction from the buffer of an output data value that will be generated when executing the first instruction:
writing into the buffer:
a first output data value generated when executing the first instruction and an indication representative of a priority for eviction from the buffer for the first output data value; and the buffer controller, when a data value is to be evicted from the buffer:
selecting a first data value to evict from the buffer using, at least in part,
any indications representative of a priority for eviction from the buffer stored with data values in the buffer; and
evicting the first data value from the buffer;

wherein an indication indicating a higher priority for eviction is set for output data values that will be used outside of the execution unit that is executing the program; and an indication indicating a higher priority for eviction is set for the first instruction when the first output data value for the first instruction will be required outside the execution unit that is executing the first instruction.

2. The method of claim 1, wherein an indication representative of a priority for eviction from the buffer of an output data value for a particular instruction is provided as a part of the particular instruction.

3. The method of claim 1, wherein indications representative of a priority for eviction for output data values for instructions indicate a relative priority for eviction from the buffer.

4. The method of claim 1, wherein respective indications representative of a priority for eviction for respective output data values for respective instructions further indicate how many instructions in future execution of the first program it will be before the respective output data values are used as input to an instruction in the first program.

5. The method of claim 1, wherein a priority for eviction that is set for an instruction is further based on one or more of:
whether the first output data value will be used as an input data value for another instruction in the first program; and
whether the first output data value will be used solely by the first program.

6. The method of claim 1, wherein:
a particular instruction is associated with an indication indicating a higher priority for eviction from the buffer when an output data value that will be generated when executing the particular instruction will be otherwise than just consumed locally by the execution unit that is executing the particular instruction.

7. The method of claim 1, wherein the buffer controller selects a data value in the buffer to evict using, at least in part, any stored indications of priority for eviction from the buffer associated with data values stored in the buffer by:
identifying data values in the buffer having a highest indicated priority for eviction of data values in the buffer, and selecting a data value having the highest indicated priority for eviction for eviction.

8. The method of claim 1, further comprising:
determining whether there is a write operation from the buffer to the storage available that is not already required for a buffer to the storage write operation; and
when it is determined that a write operation from the buffer to the storage is available and not already required for a buffer to the storage write operation:
selecting a particular data value to write from the buffer to the storage using the available write operation using, at least in part, any eviction priority indications associated with data values in the buffer; and
writing the particular data value from the buffer to the storage using the available write operation.

9. The method of claim 8, wherein selecting a data value to write from the buffer to the storage using the available write operation using, at least in part, any eviction priority indications associated with data values in the buffer, comprises:
determining whether any data values in the buffer have a highest indicatable priority level for eviction; and
when at least one data value having the highest indicatable priority level for eviction is present in the buffer, selecting one of the at least one data values having the highest indicatable priority level for eviction for eviction; and
when no data value having the highest indicatable priority level for eviction is present in the buffer, not selecting any data value for eviction using the available write operation.

10. A data processing system, the data processing system comprising:
a data processor in which execution threads may execute program instructions to perform data processing operations, the data processor comprising:
an execution unit operable to execute instructions in a program to be executed to perform data processing operations for execution threads executing the program; and
storage operable to store data values for use by the execution unit when executing an instruction to perform a data processing operation for an execution thread and to store output data values generated by the execution unit when performing a data processing operation for an instruction being executed by an execution thread;
the data processor further comprising:
a buffer intermediate between the storage and the execution unit, the buffer being operable to receive data values from the storage and to provide data values to the execution unit for use when executing an instruction, and to receive output data values from the execution unit for writing to the storage; and
a buffer controller configured to select data values in the buffer for writing to the storage and to trigger the writing of selected data values from the buffer to the storage;
the data processing system further comprising:
a processing circuit operable to, for a first program comprising a set of instructions to be executed by the execution unit of the data processor:
associate with at least one instruction in the first program an indication representative of a priority for eviction from the buffer of an output data value that will be generated when executing the at least one instruction;
wherein:
the execution unit of the data processor is further configured to, when executing a first instruction in the first program that has an associated indication representative of a priority for eviction from the buffer of an output data value that will be generated when executing the first instruction:
write into the buffer:
a first output data value generated when executing the first instruction and an indication representative of a priority for eviction from the buffer for the first output data value; and
the buffer controller is further configured to, when a data value is to be evicted from the buffer:
select a first data value to evict from the buffer using, at least in part, any indications representative of a priority for eviction from the buffer stored with data values in the buffer; and
evict the selected first data value from the buffer;
wherein an indication indicating a higher priority for eviction is set for output data values that will be used outside of the execution unit that is executing the program; and
an indication indicating a higher priority for eviction is set for the first instruction when the first output data value for the first instruction will be required outside the execution unit that is executing the first instruction.

11. The system of claim 10, wherein an indication representative of a priority for eviction from the buffer of an output data value for a particular instruction is provided as a part of the particular instruction.

12. The system of claim 10, wherein indications representative of a priority for eviction for output data values for instructions indicate a relative priority for eviction from the buffer.

13. The system of claim 10, wherein respective indications representative of a priority for eviction for respective output data values for respective instructions further indicates how many instructions in future execution of the first program it will be before the respective output data values are used as input to an instruction in the first program.

14. The system of claim 10, wherein the priority for eviction that is set for an instruction is further based on one or more of:
whether the first output data value will be used as an input data value for another instruction in the first program; and
whether the first output data value will be used solely by the first program.

15. The system of claim 10, wherein:
a particular instruction is associated with an indication indicating a higher priority for eviction from the buffer when an output data value that will be generated when executing the particular instruction will be otherwise than just consumed locally by the execution unit that is executing the particular instruction.

16. The system of claim 10, wherein the buffer controller selects a data value in the buffer to evict using, at least in part, any stored indications of priority for eviction from the buffer associated with data values stored in the buffer by:
identifying data values in the buffer having a highest indicated priority for eviction of data values in the buffer, and selecting a data value having the highest indicated priority for eviction for eviction.

17. The system of claim 10, wherein the buffer controller is configured to:
determine whether there is a write operation from the buffer to the storage available that is not already required for a buffer to the storage write operation; and
when it is determined that a write operation from the buffer to the storage is available and not already required for a buffer to the storage write operation:
select a particular data value to write from the buffer to the storage using the available write operation using, at least in part, any eviction priority indications associated with data values in the buffer; and
write the particular data value from the buffer to the storage using the available write operation.

18. The system of claim 17, wherein the buffer controller is configured to select a data value to write from the buffer to the storage using the available write operation using, at least in part, any eviction priority indications associated with data values in the buffer, by:
determining whether any data values in the buffer have a highest indicatable priority level for eviction; and
when at least one data value having the highest indicatable priority level for eviction is present in the buffer, selecting one of the at least one data values having the highest indicatable priority level for eviction for eviction; and
when no data value having the highest indicatable priority level for eviction is present in the buffer, not selecting any data value for eviction using the available write operation.

19. A data processor in which execution threads may execute program instructions to perform data processing operations, the data processor comprising:
an execution unit operable to execute instructions in a program to be executed to perform data processing operations for execution threads executing the program; and
storage operable to store data values for use by the execution unit when executing an instruction to perform a data processing operation for an execution thread and to store output data values generated by the execution unit when performing a data processing operation for an instruction being executed by an execution thread;
the data processor further comprising:
a buffer intermediate between the storage and the execution unit, the buffer being operable to receive data values from the storage and to provide data values to the execution unit for use when executing an instruction, and to receive output data values from the execution unit for writing to the storage; and
a buffer controller configured to select data values in the buffer for writing to the storage and to trigger the writing of selected data values from the buffer to the storage;
wherein:
the execution unit of the data processor is further configured to, when executing a first instruction in a first program that has an associated indication representative of a priority for eviction from the buffer of an output data value that will be generated when executing the first instruction:
write into the buffer:
a first output data value generated when executing the first instruction and an indication representative of a priority for eviction from the buffer for the first output data value; and the buffer controller is further configured to, when a data value is to be evicted from the buffer:

select a first data value to evict from the buffer using, at least in part, any indications representative of a priority for eviction from the buffer stored with data values in the buffer; and evict the first data value from the buffer;

wherein an indication indicating a higher priority for eviction is set for output data values that will be used outside of the execution unit that is executing the program; and an indication indicating a higher priority for eviction is set for the first instruction when the first output data value for the first instruction will be required outside the execution unit that is executing the first instruction.

20. A non-transitory computer readable storage medium storing computer software code which when executing on a processor performs a method of compiling a program to generate instructions for a data processor in which execution threads may execute program instructions to perform data processing operations, the data processor comprising:

an execution unit operable to execute instructions in a program to be executed to perform data processing operations for execution threads executing the program; and storage operable to store data values for use by the execution unit when executing an instruction to perform a data processing operation for an execution thread and to store output data values generated by the execution unit when performing a data processing operation for an instruction being executed by an execution thread;

the data processor further comprising:

a buffer intermediate between the storage and the execution unit, the buffer being operable to receive data values from the storage and to provide data values to the execution unit for use when executing an instruction, and to receive output data values from the execution unit for writing to the storage; and a buffer controller configured to select data values in the buffer for writing to the storage and to trigger the writing of selected data values from the buffer to the storage;

the method comprising:

for a first program comprising a set of instructions to be executed by the execution unit of the data processor:

determining for at least one instruction in the first program to be executed by the execution unit of the data processor, a priority for eviction from the buffer of an output data value that will be generated when executing the at least one instruction; and associating with the at least one instruction in the first program, an indication representative of the determined priority for eviction from the buffer for the output data value that will be generated when executing the at least one instruction;

wherein an indication indicating a higher priority for eviction is set for the output data value when the output data value will be used outside of the execution unit that is to execute the program; and an indication indicating a higher priority for eviction is set for the at least one instruction when the output data value for the at least one instruction will be required outside the execution unit that is to execute the at least one instruction.

* * * * *